United States Patent
Wong et al.

(10) Patent No.: US 7,839,668 B2
(45) Date of Patent: Nov. 23, 2010

(54) MULTIPLE OUTPUT AC/DC POWER ADAPTER

(75) Inventors: Shih-Fang Wong, Taipei Hsien (TW); Tsung-Jen Chuang, Taipei Hsien (TW); Xiang-Cheng Wan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 419 days.

(21) Appl. No.: 12/134,157

(22) Filed: Jun. 5, 2008

(65) Prior Publication Data
US 2009/0009153 A1    Jan. 8, 2009

(30) Foreign Application Priority Data
Jul. 3, 2007    (CN) .................... 2007 1 0200989

(51) Int. Cl.
*H02M 1/00*   (2007.01)
(52) U.S. Cl. ........................................ 363/144; 307/72
(58) Field of Classification Search ......... 363/141–146, 363/98, 97, 21.06, 40, 21.07; 439/131, 172, 439/52, 53, 628; 307/72, 82, 75, 125, 10.01
See application file for complete search history.

(56) References Cited

U.S. PATENT DOCUMENTS

| | | | | | |
|---|---|---|---|---|---|
| 4,630,220 | A | * | 12/1986 | Peckinpaugh | 700/298 |
| 5,159,545 | A | * | 10/1992 | Lee | 363/146 |
| 5,474,464 | A | * | 12/1995 | Drewnicki | 439/172 |
| 5,791,921 | A | * | 8/1998 | Lee | 439/172 |
| 7,304,462 | B2 | * | 12/2007 | Shvarts | 323/284 |
| 2005/0194946 | A1 | | 9/2005 | Wu | |

* cited by examiner

*Primary Examiner*—Rajnikant B Patel
(74) *Attorney, Agent, or Firm*—Frank R. Niranjan

(57) ABSTRACT

A multiple output AC/DC power adapter is provided. The adapter includes an adapter body with an output connector and more than one output plugs configured for connecting with the output connector. The adapter body includes a DC-DC converting circuit having an input terminal, an output terminal, a first adjustment terminal. The output connector includes a positive terminal, a second adjustment terminal and a negative terminal configured for connecting to the output terminal and the first adjustment terminal of the DC-DC converting circuit and ground correspondingly. The output plugs each includes an adjustment resistor having a resistance value different from the other output plugs. Therefore, when equipped with a plurality of output plugs each of the plurality of plugs having different resistor R0, the adapter can supply different output DC voltages for different electronic device.

5 Claims, 3 Drawing Sheets

MULTIPLE OUTPUT AC/DC POWER ADAPTER

BACKGROUND OF THE INVENTION

1. Field of the Invention

The present invention relates to power adapters, and particularly to a power adapter capable of outputting a plurality of different direct current (DC) voltages.

2. General Background

Different electronic products, such as mobile phones, cameras, or media players, are designed for different kinds of usage. These different electronic products are electrically different and each may use electronic components having different power requirements. As such, each of these electronic products may use specific power supply or adapters. A power adapter for a specific electronic product may not be used as the power adapter for another electronic product of a different model/make. Therefore, when using different electronic products, a plurality of specific power adapters each corresponding to the rated operating voltage and/or current for each electronic product must be used. As a result, it is inconvenient for a user to carry and use these different electronic products with carrying each specific power adapter.

Although conventional power adapters which are capable of outputting a plurality of different direct current (DC) for different electronic devices are provided, a user must firstly select an output plug connected with an electronic device, then select an resistance interface in accordance with the operation power of the matching electronic device☐ which is inconvenient for the user.

Therefore, it is necessary to provide a multiple output AC/DC power adapter which is capable of outputting a plurality of different output DC with specific voltage values by only selecting different output plugs for various different electronic devices.

SUMMARY OF INVENTION

A multiple output AC/DC power adapter is provided. The adapter includes an adapter body having a DC-DC converting circuit, the DC-DC converting circuit including a first adjustment terminal and an output terminal; a first resistor connected between the output terminal and the first adjustment terminal; a second resistor connected between the first adjustment terminal and ground; an output connector connected with the DC-DC converting circuit; and more than one output plugs configured for connecting with the output connector. Each of the output plugs comprises an adjustment resistor having a resistance value different from the other output plugs. The adjustment resistor is parallel to the second resistor when the output plug is connected to the output connector.

Other features and advantages will be apparent to one with skill in the art upon examination of the following drawings and detailed description.

DETAILED DESCRIPTION OF THE EMBODIMENTS

Figure 1:
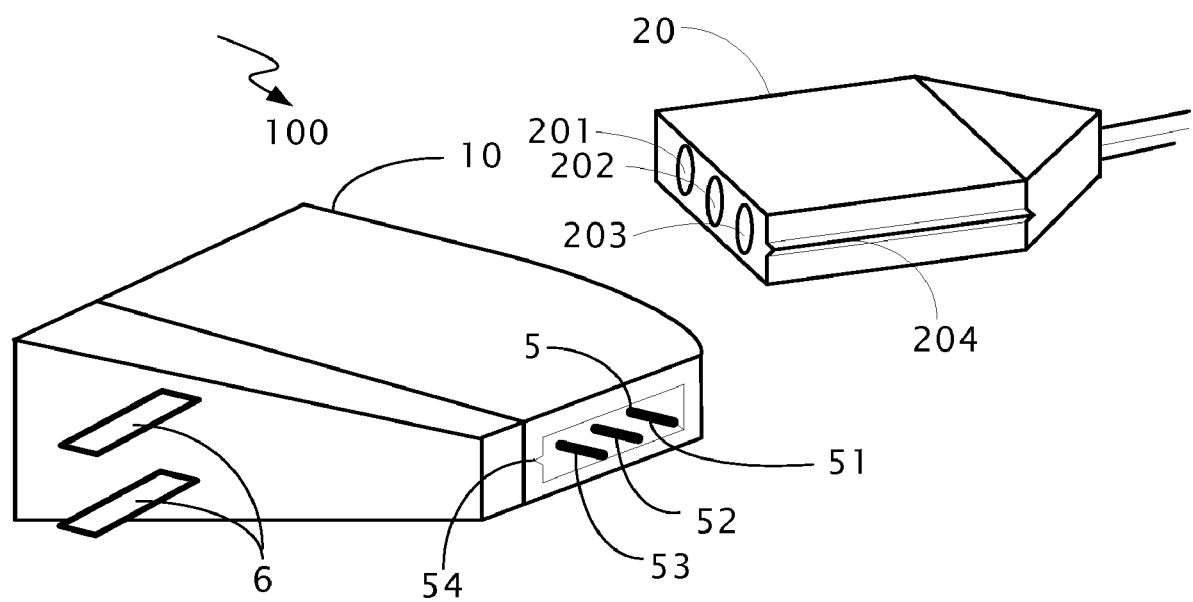
FIG. 1 is a perspective view of a multiple AC/DC power adapter in accordance with the present invention.

FIG. 1 is a perspective view of a multiple output AC/DC power adapter 100 (hereinafter "the adapter 100") in accordance with the present invention. The adapter 100 includes an adapter body 10 and more than one output plugs 20 (here, only one output plug 20 is shown). The adapter body 10 includes an output connector 5 and an alternative current (AC) plug 6. The output connector 5 includes a positive terminal 51, a second adjustment terminal 52, a negative terminal 53, and a concave portion 54. The adapter body 10 converts an alternating current (AC) voltage from an AC source (not shown) via the AC plug 6 into a DC voltage and outputs the DC voltage to the output plug 20 via the output connector 5. The output plug 20 includes input terminals 201, 202, 203 and a convex portion 204. When the output plug 20 is inserted into the output connector 5, the concave portion 54 engages with the convex portion 204, and the positive terminal 51, the second adjustment terminal 52, and the negative 53 connects with the input terminals 201, 202, 203 correspondingly.

Figure 2:
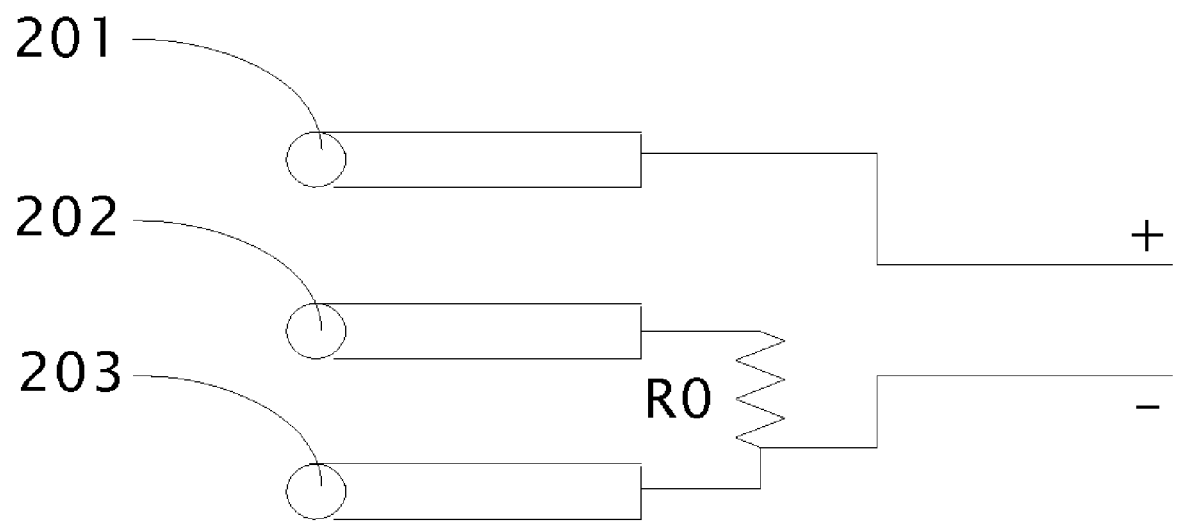
FIG. 2 is a circuit diagram of an output plug shown in FIG. 1.

FIG. 2 is a circuit diagram of the output plug 20. The output plug 20 further includes an adjustment resistor R0. The adjustment resistor R0 is connected between the input terminals 202, 203 of the output plug 20. The adjustment resistor R0 may be a constant resistor having a constant resistance value. The adjustment resistor R0 may otherwise be a variable resistor having a variable resistance value. Generally, the output plugs 20 of the adapter 100 each includes an adjustment resistor R0 having a resistance value different from adjustment resistor R0 of the other output plugs 20. The plurality of output plugs 20 with different resistor R0 enable the adapter 100 to provide power to different electronic devices with different rated operation voltage values.

Figure 3:
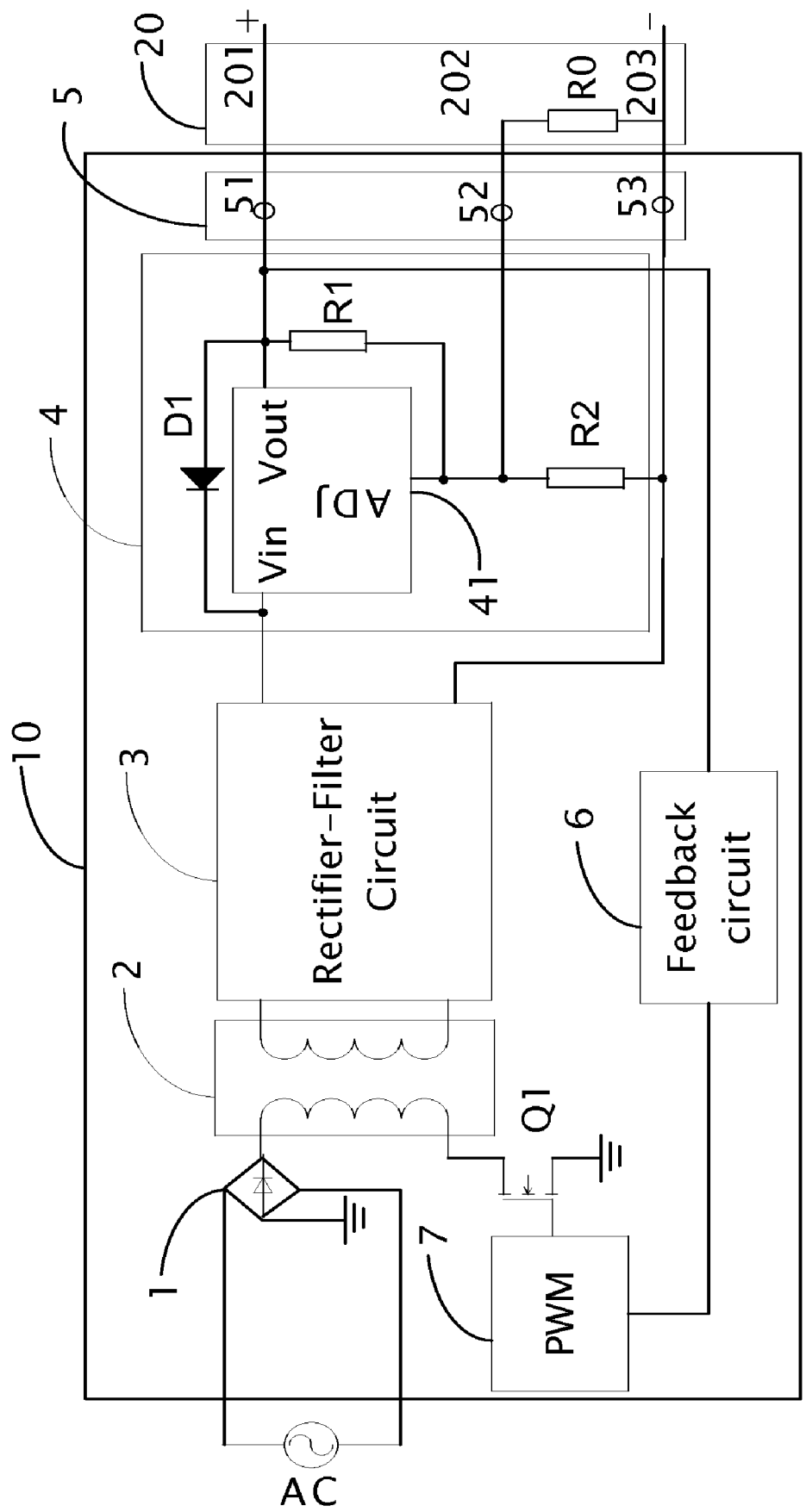
FIG. 3 is a circuit diagram of the multiple AC/DC power adapter according to an embodiment of the present invention.

FIG. 3 is a circuit diagram of the adapter 100 according to an embodiment of the present invention. The adapter body 10 includes a bridge rectifier 1, a transformer 2, a rectifier-filter circuit 3, a DC-DC converting circuit 4, a feedback circuit 6, a Pulse-Width Modulation (PWM) 7, a switch Q1 and the output connector 5. The bridge rectifier 1 is configured to rectify an input AC voltage into a full-wave rectified DC voltage. The transformer 2 has a primary winding and a secondary winding (not labeled). The primary winding of the transformer 2 is configured to store energy received from the input AC voltage when the switch Q1 which is connected in series with the primary winding of the transformer 2 is on and release the stored energy to the secondary winding when the switch Q1 is off. The switching operations of the switch Q1 is manipulated by the PWM 7.

The rectifier-filter circuit 3, which connected across the secondary winding of the transformer 2, is configured to perform rectification and filtration to the energy received by the secondary winding of the transformer 2 to generate a desired low-level output DC voltage. The feedback circuit 6 is configured to detect variations on the low-level output DC voltage and in response thereto issue a feedback signal to the PWM 7 to enable the PWM 7 to stabilize the low-level output DC voltage at a predetermined level. The DC-DC converter 4 is used for receiving the low-level output DC voltage and converting the low-level output DC voltage into an output DC voltage.

The DC-DC converting circuit 4 includes a three terminal voltage adjustor 41, a first resistor R1, a second resistor R2 and a diode D1. The three terminal voltage adjustor 41 includes an input terminal Vin, an output terminal Vout and a first adjustment terminal ADJ. The input terminal Vin and the output terminal Vout are respectively connected to the output terminal of the rectifier-filter circuit 3 and the positive terminal 51 of the output connector 5. The diode D1 is connected between the input terminal Vin and the output terminal Vout. The first adjustment terminal ADJ is connected to ground via the second resistor R2. The first resistor R1 is connected between the output terminal Vout and the first adjustment terminal ADJ of the three terminal voltage regulator 41.

When the output plug 20 is connected to the output connector 5, the adjustment resistor R0 is parallel to the second resistor R2. Because the voltage of the output terminal Vin is maintained higher than the first adjustment terminal ADJ for a specific voltage A at ADJ, the output DC voltage of the adapter 1 O0 is calculated by a formula: Vout=A×(1+(R2R1+R0R1)/R2R0). According to this formula, the output DC voltage of the adapter 100 changes in accordance with the adjustment resistor R0. Therefore, when equipped with a plurality of output plugs 20 each of the plurality of plugs having different resistor R0, the adapter 100 can supply different output DC voltages for different electronic device.

Although the present invention has been specifically described on the basis of a preferred embodiment and method thereof, the invention is not to be construed as being limited thereto. Various changes or modifications may be made to the embodiments without departing from the scope and spirit of the invention.

What is claimed is:

1. A multiple output AC/DC power adapter, comprising:
    an adapter body having a DC-DC converting circuit, the DC-DC converting circuit comprising a first adjustment terminal and an output terminal;
    a first resistor connected between the output terminal and the first adjustment terminal;
    a second resistor connected between the first adjustment terminal and ground;
    an output connector connected with the DC-DC converting circuit; and
    more than one output plugs configured for connecting with the output connector, each of the output plugs comprising an adjustment resistor, each adjustment resistor having a resistance value different from the adjustment resistor of the other output plugs, the adjustment resistor is parallel to the second resistor when one of the more than one output plug is connected to the output connector.

2. The multiple output AC/DC power adapter as claimed in claim 1, wherein the output connector comprises: a positive terminal, a second adjustment terminal, and a negative terminal which are connected to the output terminal, the first adjustment terminal of the DC-DC converting circuit, and the ground correspondingly.

3. The multiple output AC/DC power adapter as claimed in claim 2, wherein the adjustment resistor is connected between the second adjustment terminal and the ground.

4. The multiple output AC/DC power adapter as claimed in claim 3, wherein the adjustment resistor is a constant resistor.

5. The multiple output AC/DC power adapter as claimed in claim 3, wherein the adjustment resistor is a variable resistor.

* * * * *